(12) United States Patent
Shinbori

(10) Patent No.: US 9,081,584 B2
(45) Date of Patent: Jul. 14, 2015

(54) RECORDING MEDIUM STORING COMPILING PROGRAM, COMPILING METHOD, AND COMPILING DEVICE

(71) Applicant: FUJITSU LIMITED, Kawasaki-shi, Kanagawa (JP)

(72) Inventor: Kenji Shinbori, Shimizu (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 13/894,703

(22) Filed: May 15, 2013

(65) Prior Publication Data

US 2014/0013314 A1 Jan. 9, 2014

(30) Foreign Application Priority Data

Jul. 3, 2012 (JP) .................................. 2012-149747

(51) Int. Cl.
*G06F 9/45* (2006.01)
*G06F 9/44* (2006.01)
*G06F 9/455* (2006.01)

(52) U.S. Cl.
CPC ........ *G06F 8/41* (2013.01); *G06F 8/443* (2013.01); *G06F 9/45516* (2013.01)

(58) Field of Classification Search
CPC ........ G06F 8/41; G06F 8/443; G06F 9/45516
See application file for complete search history.

(56) References Cited

U.S. PATENT DOCUMENTS

| | | | |
|---|---|---|---|
| 7,308,680 B2 * | 12/2007 | Grover et al. ................. | 717/114 |
| 7,987,457 B2 * | 7/2011 | Biswas et al. ................. | 717/145 |
| 8,359,496 B1 * | 1/2013 | Bornstein et al. ............. | 714/45 |
| 8,365,156 B2 * | 1/2013 | Sollich .......................... | 717/146 |
| 8,578,056 B1 * | 11/2013 | Satish et al. .................. | 709/246 |
| 8,924,922 B2 * | 12/2014 | Biswas et al. ................. | 717/104 |
| 2009/0100410 A1 * | 4/2009 | Pouliot ........................ | 717/122 |
| 2009/0144710 A1 * | 6/2009 | Kielstra et al. ............... | 717/148 |
| 2012/0110560 A1 * | 5/2012 | Fisher et al. .................. | 717/146 |
| 2014/0013314 A1 * | 1/2014 | Shinbori ....................... | 717/146 |

FOREIGN PATENT DOCUMENTS

| | | |
|---|---|---|
| JP | 2000-353112 | 12/2000 |
| JP | 2004-171064 | 6/2004 |

OTHER PUBLICATIONS

Chen et al., A simple typed intermediate language for object-oriented languages, Jan. 2005, 12 pages.*
Shi et al., An intermediate language level optimization framework for dynamic binary translation, May 2007, 7 pages.*
Zhao et al., Intermediate language extensions for parallelism, Oct. 2011, 12 pages.*

* cited by examiner

*Primary Examiner* — Thuy Dao
(74) *Attorney, Agent, or Firm* — Oblon, McClelland, Maier & Neustadt, L.L.P.

(57) ABSTRACT

A recording medium storing therein a compiling program to be executed by a computer, the program includes: compiling a portion of a source corresponding to at least one operation of a plurality of operations into at least one partial object of a plurality of partial objects included in an object; generating first information for identifying a portion involved in the compiling of the at least one partial object; and storing, in a memory, object expansion information including second information, which indicates the at least one operation, and the first information, with associating the object expansion information with the at least one partial object, wherein the object expansion information identifies a partial object generated by a portion involved in the compiling relating to a compilation failure.

15 Claims, 16 Drawing Sheets

| OFFSET | ASSEMBLER NOTATION OF OBJECT | INTERMEDIATE LANGUAGE |
|---|---|---|
| 00010 | LOAD DATA2 | |
| 00020 | LOAD DATA3 | ADD DATA1,DATA2,DATA3 |
| 00030 | ADD | |
| 00040 | STORE DATA1 | |
| 00050 | LOAD DATA1 | CALL DISPLAY DATA1 |
| 00060 | CALL DISPLAY | |
| 00070 | LOAD 100 | |
| 00080 | LOAD DATA3 | ADD DATA1,100,DATA3 |
| 00090 | ADD | |
| 00100 | STORE DATA1 | |
| 00110 | LOAD DATA1 | CALL DISPLAY , DATA1 |
| 00120 | CALL DISPLAY | |
| 00130 | LOAD DATA2 | |
| 00140 | LOAD 200 | ADD DATA1,DATA2,200 |
| 00150 | ADD | |
| 00160 | STORE DATA1 | |
| 00170 | LOAD DATA1 | CALL DISPLAY DATA1 |
| 00180 | CALL DISPLAY  ,212 | ,222 |
| 00190 | LOAD -30000 | ADD DATA1, 100 ,200 |
| 00200 | STORE DATA1 | |
| 00210 | LOAD DATA1 | CALL DISPLAY , DATA1 |
| 00220 | CALL DISPLAY ,214 | ,224 |
| 00230 | LOAD 300 | MOV DATA1,300 |
| 00240 | STORE DATA1 | |
| 00250 | LOAD DATA1 | CALL DISPLAY,DATA1 |
| 00260 | CALL DISPLAY ,216 | ,226 |
| 00270 | LOAD -10 | ADD RETCODE, 10 ,-10 |
| 00280 | STORE RETCODE | |
| 00270 | RETURN | |

FIG. 2B

| OFFSET | OBJECT EXPANSION INFORMATION |
|---|---|
| 00360 | [ADD] , 1.5 ,W,W,W,00010,R1,R5 |
| 00370 | [CALL] ,2.1 , C , 00050,R1,R2 |
| 00380 | [ADD] , 1.5 ,W,W,W, 00070,R2,R5 |
| 00390 | [CALL] ,2.1, C , 00110,R1,R2 |
| 00400 | [ADD] , 1.5 ,W,W,W, 00130,R3,R5 |
| 00410 | [CALL] ,2.1, C , 00170,R1,R2      ~232 |
| 00420 | [ADD] , 1.5 ,W,W,W,00190,R4,R5 |
| 00430 | [CALL] ,2.1, C , 00210,R1,R2      ~234 |
| 00440 | [MOV],1.0, W,W,00230,R2 |
| 00450 | [CALL] ,2.1, C , 00250,R1,R2 |
| 00460 | [MOV],1.0, C,C,00230,R2      ~236 |
| 00420 | [ADD] , 1.5 ,C,C,C,00270,R4,R5 |

FIG. 3A

```
INTERMEDIATE LANGUAGE DEFINITION ADD VERSION 1.5
If OP2=VARIABLE && OP3=VARIABLE
         LOAD       OP2        ⎫
         LOAD       OP3        ⎬ ROUTE 1
         ADD                   ⎭
else If OP2=VARIABLE && OP3=INVARIABLE
         LOAD       OP2        ⎫
         LOAD       INVARIABLE(OP3)  ⎬ ROUTE 2
         ADD                   ⎭
else If OP2=INVARIABLE && OP3=VARIABLE
         LOAD       INVARIABLE(OP2)  ⎫
         LOAD       OP3        ⎬ ROUTE 3
         ADD                   ⎭
else If OP2=INVARIABLE && OP3=INVARIABLE
         LOAD       INVARIABLE(OP2)+INVARIABLE(OP3) ⎬ ROUTE 4
endif

STORE  OP1                     ⎬ ROUTE 5
```

FIG. 3B

```
INTERMEDIATE LANGUAGE DEFINITION CALL VERSION 2.1

FOR NUMBER OF PARAMETERS {   ⎫
           LOAD  PARAMETER n      ⎬ ROUTE 1
     }                            ⎭
     CALL LIBRARY NAME NAME       ⎬ ROUTE 2
```

FIG. 3C

```
INTERMEDIATE LANGUAGE DEFINITION MOV VERSION 1.0

If OP2=VARIABLE           ⎫
          LOAD OP2             ⎬ ROUTE 1
     else if OP2=INVARIABLE    ⎫
          LOAD INVARIABLE (OP2) ⎬ ROUTE 2
     endif
     STORE  OP1                ⎬ ROUTE 3
```

FIG. 5A

```
                           ┌502
00017748 29000007   sethi  %hi(0x00001c00),%l4  ⎫
0001774C A81523F0   or     %l4,0x03f0,%l4        ⎬ 1. ADDRESS CALCULATION   OP1 (REGISTER), OP2 (VARIABLE),
00017750 A805001A   add    %l4,%i2,%l4          ⎭    OP3 (CORRECTION VALUE)

┌504
00017754 B4050013   add    %l4,%i3,%i2          ⎫ 2. ADDRESS CALCULATION   OP1 (REGISTER), OP2 (VARIABLE),
00017758 B406B085   add    %i2,-0xf7b,%i2       ⎭    OP3 (CORRECTION VALUE)

0001775C D00EA000   ldub   [%i2+0x000],%o0      ⎫ 3. CHARACTER COMPARISON  OP1 (LABEL), OP2 (VARIABLE),
00017760 DE0EA001   ldub   [%i2+0x001],%o7      ⎭    OP3 (VARIABLE)
```

FIG. 5B

```
00 x x x x [ADDRESS CALCULATION],C,W,C,1.5,00017748, Rx
00 x x x x [ADDRESS CALCULATION],C,W,C,1.5,00017754,Rx,Rx1
00 x x x x [CHARACTER COMPARISON],CL,W,W,4.5,0001775C,Rx,Rx1
```

FIG. 6A

```
0000A178  37000007    sethi  %hi(0x00001c00),%i3   ┐
0000A17C  B616E3F0    or     %i3,0x03f0,%i3         ├ 602   1, ADDRESS CALCULATION
0000A180  B606C01D    add    %i3,%i5,%i3           ┘        OP1 (REGISTER) , OP2 (VARIABLE) , OP3 (CORRECTION
                                                            VALUE)

0000A184  C20EFC6E    ldub   [%i3-0x392],%g1                ┌──────────────────────────────────────────────┐ 612
0000A188  C80EFC6F    ldub   [%i3-0x391],%g4+1             │2, ADDITION OP1 (REGISTER) , OP2 (VARIABLE) , OP3 (VARIABLE)│
0000A18C  C22EFFFE    add    %g1, %g4,%g1                   └──────────────────────────────────────────────┘

0000A190  03000007    sethi  %hi(0x00001c00),%g1   ┐        3, ADDRESS CALCULATION
0000A194  821063F0    or     %g1,0x03f0,%g1  ┐ 604 │        OP1 (REGISTER) , OP2 (VARIABLE) , OP3 (CORRECTION VALUE)
0000A198  BA004003    add    %g1,%g3,%i5    ┘      ┘

0000A19C  DE0F7C73    ldub   [%i5-0x38d],%o7       ┐        4, CHARACTER COMPARISON
0000A1A0  C20F7C74    ldub   [%i5-0x38c],%g1       ┘        OP1 (LABEL) , OP2 (VARIAVLE) , OP3 (VARIABLE)
```

FIG. 6B

```
00 x x x x [ADDRESS CALCULATION],C,W,C,1.5,0000A178, Rx   ; 622
00 x x x x [ADDITION ],W,W,1.6,0000A184,Rx,Rx1
00 x x x x [ADDRESS CALCULATION],C,W,C,,1.50000A190,Rx,Rx1
00 x x x x [CHARACTER COMPARISON],CL,W,W,4.5,0000A19C,Rx,Rx1
```

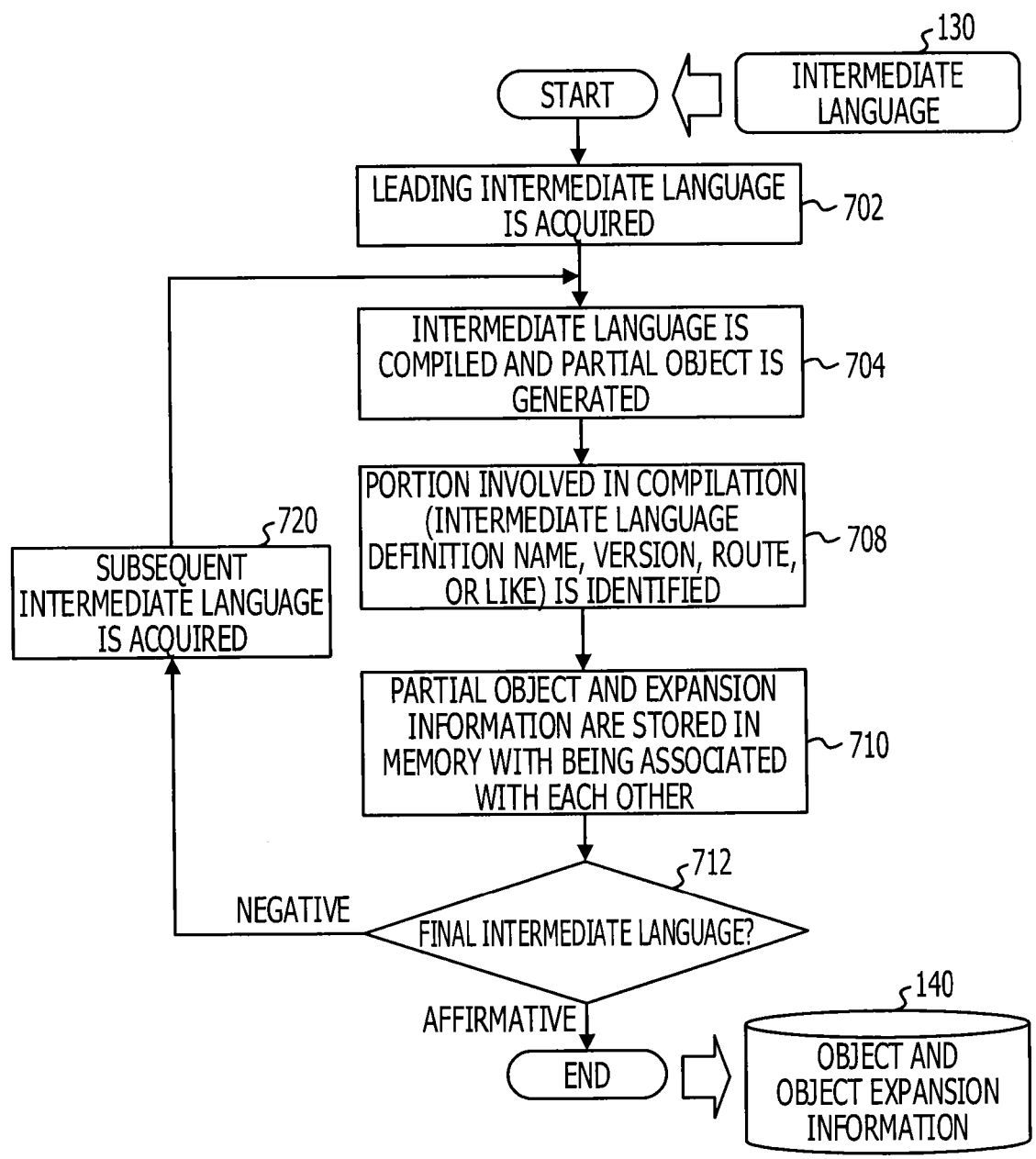

FIG. 8A

```
IF OP3.LENGTH<=8 THEN
// OPD2 AND OPD3 ARE COMPARED WITH EACH OTHER
        setROOT(52);
        MOV    w1, [OPD2];
        ROL    w1, 16;
        MOV    w0, [OPD3];
        ROL    w0, 16;
        CMP    w1, w0;
        JNE    SHORT lb1;
END-IF
IF OP3.LENGTH=8 THEN
// OPD2+4 AND OPD3+4 ARE COMPARED WITH EACH OTHER
        setROOT(53);                        ~-801
        MOV    w1, [OPD2+4];
        ROL    w1, 16;
        MOV    w0, [OPD3+4];
        ROL    w1, 16;                      ~-802
        CMP    w1, w0;
        JNE    SHORT lb2;
END-IF
            :
Lb1:
```

FIG. 8B

```
[ADD] ,00000010,1.5,w,w,w,R1,R5
[CALL], 00000050,2.1,c,R1
[CHARACTER COMPARISON] ,4.5, 000001A0 , C, C, C, R1,R2,····
    :
[CHARACTER COMPARISON] ,4.5, 000001B0, C,W,W,R1,R52,R53·····
    :
                                    812
```

FIG. 12

```
#include <stdio.h>
#include "xxxxxx.h"
void ADD(void)
        long long int RESULT = 0;
        setFileData("ADD,v 1.1.2.5 2012/2/10 04:19:23 shinbori Exp"); ◀------- 1210 if((OPD2_TYPE == imm) && (OPD3_TYPE == imm)){ ------- 1221
                setROOT(1); ◀-----------
                RESULT = OPD2_IMM + OPD3_IMM;
        }
        YVFDISPL(1) = (long long int)RESULT;
        if(OPD2_TYPE == imm){ ----------- 1222
                setROOT(2); ◀-----------
                if(OPD3_TYPE == imm){ ----------- 1223
                        setROOT(3); ◀-----------
                        //MOV    rop1, RESULT;
                        static unsigned char SKLV57 [] = {0x50,0x00,0x00,0x44};
                        instruction_set((struct skl_t *)&SKLV57);
                }else{
                        setROOT(4); ◀----------- 1224
                        //MOV    rop1,OPD2_IMM;
                        static unsigned char SKLV60 [] = {0x50,0x00,0x00,0x44,0x34,0x20,0x80,0xFF};
                        instruction_set((struct skl_t *)&SKLV60);
                        //ADD    rop1,rop3;
                        static unsigned char SKLV61 [] = {0x04,0x00,0x00,0x14,0x34};
                        instruction_set((struct skl_t *)&SKLV61);
                }
        }else{
                setROOT(5); ◀----------- 1225
                if(OPD3_TYPE == imm){ ----------- 1226
                        setROOT(6); ◀-----------
                        //MOV    rop1,OPD3_IMM;
                        static unsigned char SKLV66 [] = {0x50,0x00,0x44,0x34,0x20,0x80,0xFF};
                        instruction_set((struct skl_t *)&SKLV66);
                        //ADD    rop1,rop2;
                        static unsigned char SKLV67 [] = {0x04,0x01,0x90,0x41,0x00};
                        instruction_set((struct skl_t *)&SKLV67);
                }else{
                        setROOT(7); ◀----------- 1227
                        //MOV    rop1,rop2;
                        static unsigned char SKLV70 [] = {0x50,0x00,0x00,0x00} ;
                        instruction_set((struct skl_t *)&SKLV70);
                        //ADD    rop1,rop3;
                        static unsigned char SKLV71 [] = {0x04,0x00,0x00} ;
                        instruction_set((struct skl_t *)&SKLV71);
                }
        }
        // STORE.OPD1_Byte [OPD1],w0;
        which(OPD1_Byte) {
        case 1:                           ----------- 1228
                setROOT(8); ◀-----------
                mov byte[OPD1],rop1;
                break;
        case 2:                           ----------- 1229
                setROOT(9); ◀-----------
                mov word[OPD2],rop1;
        : OMITTED
        return;
```

RECORDING MEDIUM STORING COMPILING PROGRAM, COMPILING METHOD, AND COMPILING DEVICE

CROSS-REFERENCE TO RELATED APPLICATION(S)

This application is based upon and claims the benefit of priority of the prior Japanese Patent Application No. 2012-149747, filed on Jul. 3, 2012, the entire contents of which are incorporated herein by reference.

FIELD

The embodiments discussed herein are related to a recording medium storing therein a compiling program, a compiling method, and a compiling device.

BACKGROUND

Software is converted from a source program into an object of a machine language in an executable format by a compiler. As the extension of a file, ".exe", ".dll", or the like is assigned to the file storing therein the object.

The compiler translates the source program into an intermediate language once, and translates the intermediate language into a final machine language.

A related technique has been disclosed in Japanese Laid-open Patent Publication No. 2004-171064 or Japanese Laid-open Patent Publication No. 2000-353112.

SUMMARY

According to one aspect of the embodiments, a recording medium storing therein a compiling program to be executed by a computer, the program includes: compiling a portion of a source corresponding to at least one operation of a plurality of operations into at least one partial object of a plurality of partial objects included in an object; generating first information for identifying a portion involved in the compiling of the at least one partial object; and storing, in a memory, object expansion information including second information, which indicates the at least one operation, and the first information, with associating the object expansion information with the at least one partial object, wherein the object expansion information identifies a partial object generated by a portion involved in the compiling relating to a compilation failure.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A illustrates an exemplary intermediate language and an exemplary object;
FIG. 2B illustrates exemplary object expansion information;
FIG. 3A to FIG. 3C illustrate an exemplary intermediate language definition;
FIG. 5A and FIG. 5B illustrate an exemplary influence of a failure of a compiler on an object;
FIG. 6A and FIG. 6B illustrate an exemplary influence of a failure of a compiler on an object;
FIG. 7 illustrates an exemplary processing;
FIG. 8A and FIG. 8B illustrate exemplary identification of a failure;
FIG. 12 illustrates an exemplary intermediate language definition.

DESCRIPTION OF EMBODIMENTS

Figure 1:
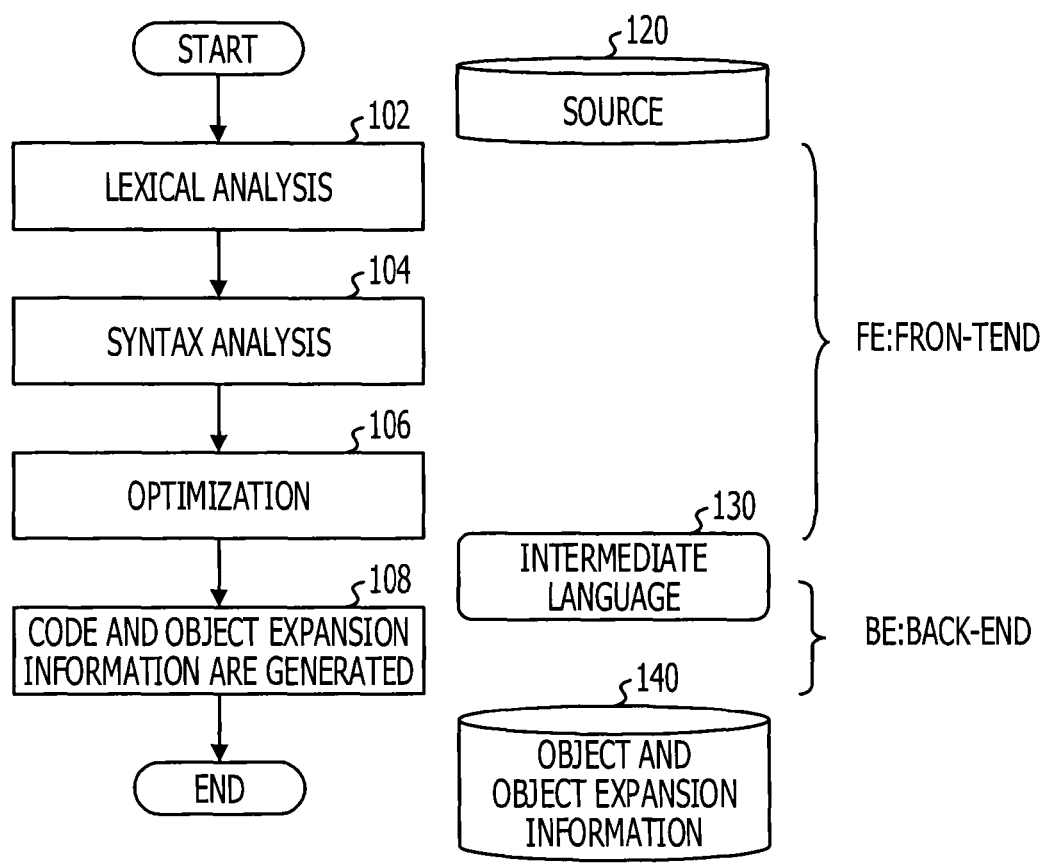
FIG. 1 illustrates an exemplary compilation of a compiler.

When a failure (bug) has been found in a compiler, an object, generated using the compiler containing the failure, may contain a failure. Since the compiler is basic software developed with great attention, the failure (bug) of the compiler may be rare. When a time has elapsed after the development of the compiler, a failure may be found. Some objects generated by the compiler containing the failure (bug) may have failures. An object generated by the compiler containing the failure may not have a failure. An object where the failure portion of the compiler has been used at the time of compilation may have a failure.

A time is taken from the release of the compiler to the finding of the failure of the compiler. Therefore, when the failure of the compiler has been found, application software development may have considerably moved ahead or an object file compiled by the compiler having a failure may have been used in a task.

The compiler may have a plurality of versions. Therefore, when the failure of the compiler has been found, it may be difficult to determine whether a compiled object has been subject to the influence of the failure of the compiler. When the object has been subject to the influence of the compiler failure, a portion of an influenced object file may be found and dealt with.

It may be difficult to identify the range of a source code (or an intermediate language), an instruction pattern, a used compiler portion, or the like, from the sequence (or the pattern) of machine language instructions of an object. Therefore, it may be difficult to determine whether or not there is an influence from the failure of the compiler. It has been determined that there is an influence from the failure of the compiler, and a correct object may be erroneously detected. It may be difficult to understand a situation at the time of compilation, only from an object. Information such as the version of the compiler or an intermediate language definition file converting the intermediate language into an object may not be acquired only from an object file.

A source may also be compiled again by a compiler from which a failure has been removed. When vast amounts of source assets have been developed, it may be difficult to recompile a source.

So as to check whether or not a portion of the compiler having a failure has been used, the compiler may also be modified. Since a source is compiled by the modified compiler, it may be confirmed whether or not the failure portion of the compiler has influenced the compilation of an existing object. A cost and a time may be taken for the modification of the compiler and the compilation of the source by the modified compiler.

Owing to the analysis of the intermediate language, the possibility of the stack overflow of a user program may be detected.

The row number of the intermediate language and the symbol information of an internal variable which the compiler automatically generates therewithin are set as debugging information, and debugging in an intermediate language level may be performed by the setting of a breakpoint and stepwise execution in the intermediate language or the reference to the internal variable. Since a plurality of embodiments are not exclusive with respect to one another, individual elements of the plural embodiments may also be combined with one another in the absence of the occurrence of an inconsistency. The order of processing operations may also be rearranged in the absence of the occurrence of an inconsistency, and a plurality of processing operations may also be simultaneously executed.

A computer executes program codes stored in a recording medium, and hence, a function is realized. Based on an instruction of a program code, another program such as an OS operating on the computer may perform the whole or part of processing.

A source program to be the object of compilation may be referred to as a "source". The set of machine languages where the source has been compiled may be referred to as an "object". An intermediate language generated in the middle of the compilation may be referred to as an "intermediate language". A definition including a rule for converting the intermediate language into the machine language may be referred to as an "intermediate language definition". In the compilation, the source may also be compiled and the object may also be generated, without the intermediate language being generated. The generation of the intermediate language, the processing for the intermediate language, or the like may not be performed. As the machine language, an assembler language may be used.

FIG. 1 illustrates an exemplary compilation by a compiler.

A source 120 may be software including a plurality of instructions. The source may be described based on a rule according to a program language such as a COBOL language or a C language.

In an operation 102, the lexical analysis of the source is performed.

In an operation 104, using the result of the lexical analysis, the syntax analysis of the source is performed.

In an operation 106, the optimization of the analyzed syntax is performed.

By the optimization, an intermediate language 130 is generated. The above-mentioned individual operations may be referred to as the front-end (FE) of the compiler. The intermediate language may be used for the following processing.

In an operation 108, the set (object) of machine language codes is generated. Object expansion information is generated in a manner corresponding to the machine language. When the failure of the compiler itself has been found, the object expansion information may be used for searching for which portion of the machine language the failure portion of the compiler has influenced, and so forth. The operation 108 may be referred to as the back-end (BE) of the compiler. In the operation 108, at least object and object expansion information 140 may be generated.

FIG. 2A illustrates an exemplary intermediate language and an exemplary object. FIG. 2B illustrates exemplary object expansion information. As a machine language in the drawings, an assembler notation is used.

In FIG. 2A, the intermediate language and the object are associated with each other. An offset is additionally noted in the assembler notation of the machine language. The offset indicates a distance from the top of the source. In FIG. 2A, in place of the offset, a row number having 10 increments is noted. So as to be associated with the assembler notation of one object or a plurality of objects, an offset (row number) is written side by side, as information indicating the position of the intermediate language on the memory.

Also in the object expansion information illustrated in FIG. 2B, the row number is noted as an alternative to the offset. Each of instructions 212, 214, and 216 of the machine language is a LOAD/STORE instruction, and a corresponding intermediate language may be different. For example, the LOAD/STORE instruction 212 may correspond to an instruction where an intermediate language ADD instruction 222 is expanded to a machine language. The LOAD/STORE instruction 214 may correspond to an instruction where an intermediate language MOV instruction 224 is expanded to a machine language. The LOAD/STORE instruction 216 may correspond to an instruction where an intermediate language ADD instruction 226 is expanded to a machine language. It may be difficult to determine an intermediate language before expansion, only from the machine language. It may be difficult to understand which portion of the compiler has been used, only from the machine language. When a failure due to the compiler has been later found, it may not be correctly determined whether there is an influence from the failure portion of the compiler, only from the machine language. For example, since the object expansion information illustrated in FIG. 2B is held with being associated with the machine language, it may be determined whether or not there is an influence from a failure portion due to the compiler.

Object expansion information 232 at an offset position 00420 illustrated in FIG. 2B may include, for example, the following content. [ADD],1.5,W,W,W,00190,R4,R5. "[ADD]" indicates that an intermediate language is an ADD instruction. The name of the intermediate language or the name of an intermediate language definition defining the intermediate language may be used. The name of the intermediate language or the name of the intermediate language definition defining the intermediate language may be an example of an operation. "1.5" indicates that the version of the intermediate language definition is 1.5. "W,W,W," indicates operand allocation information. W indicates user data. That there are three Ws indicates that there are three operands. "00190" indicates the offset of a machine language instruction (the position of the machine language instruction). As the offset, a row number may also be used. The machine language instruction at an offset 00190 is "LOAD-30000". Since the machine language instruction offset of object expansion information indicated at an offset 00430 indicates "00210", an intermediate language ADD instruction corresponds to two instructions of the machine language at offsets 00190 and 00200, for example, "LOAD-30000STORE DATA1". "R4, R5" indicates that a route 4 and a route 5 are used at the time of compilation, from among basic blocks within the intermediate language definition of the ADD instruction. Using this information, a used basic block within the intermediate language definition, for example, a route may be identified.

Object expansion information 234 at an offset 00440 illustrated in FIG. 2B may include, for example, the following information. Based on the information of [MOV],1.0,W,W, 00230,R2, it may be understood that an intermediate language is a MOV instruction, the version of the intermediate language definition is 1.0, both of two operands are user data, a machine language instruction has been started from an offset 00230, and the basic block (route) R2 of the intermediate language definition of the MOV instruction has been used.

Object expansion information 236 at the offset 00420 illustrated in FIG. 2B may include, for example, the following information. Based on the information of [ADD],1.5,C,C,C, 00270,R4,R5, it may be understood that an intermediate language is an ADD instruction, the version of the intermediate language definition is 1.5, three operands are compiler management data (C means compiler management data), a machine language instruction has been started from an offset 00270, and the basic blocks (routes) R4 and R5 of the intermediate language definition of the ADD instruction have been used.

For example, when a failure relating to the basic blocks (routes) R4 and R5 of the intermediate language definition of the ADD instruction has been found, object management information may be searched for where the intermediate language is the ADD instruction and R4 and R5 exist, from the object expansion information. By this search, the pieces of the object expansion information 232 and 236 are matched. It turns out that the instructions 212 and 216 of the machine language are influenced by the failure of the compiler.

FIG. 3A to FIG. 3C illustrate an exemplary intermediate language definition.

FIG. 3A illustrates the intermediate language definition of an ADD instruction. In the intermediate language definition illustrated in FIG. 3A, a rule for converting an intermediate language into a specific machine language is defined in accordance with whether two operands OP2 and OP3 are invariables or variables. The intermediate language definition is divided into routes serving as a plurality of basic blocks with a plurality of branching instructions existing therewithin as boundaries. In FIG. 3A, as the basic blocks, a route 1 to a route 5 are illustrated. The intermediate language definition is divided with a plurality of routes, and information where a route has been used is included in the object management information illustrated in FIG. 2A and FIG. 2B. Therefore, it turns out which route of the intermediate language has been used.

FIG. 3B illustrates the intermediate language definition of a CALL instruction. In the intermediate language definition illustrated in FIG. 3B, since a FOR portion is the target of branching, a route 1 and a route 2 are illustrated.

FIG. 3C illustrates the intermediate language definition of a MOV instruction. The intermediate language definition illustrated in FIG. 3C is divided into a route 1 to a route 3.

Figure 4:
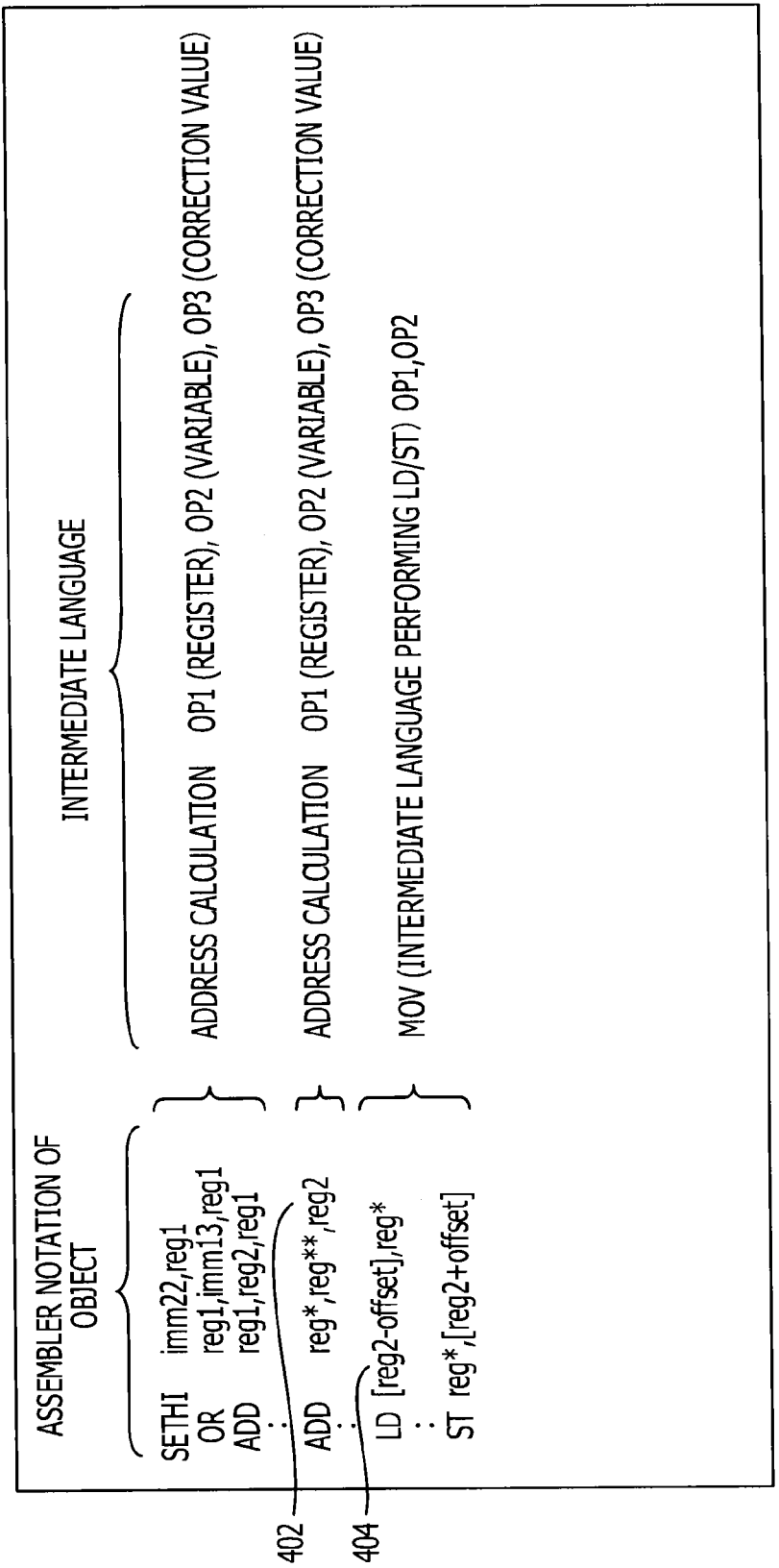
FIG. 4 illustrates an exemplary failure of register allocation.

FIG. 4 illustrates an exemplary failure of register allocation.

In FIG. 4, when an instruction pattern exists where three instructions are lined up in order (the case of an address calculation instruction, an address calculation instruction, and a MOV instruction), the failure of the register allocation occurs. An LD instruction utilizes a register reg2. As for the LD instruction, it is assumed that a register allocated before a SETHI instruction is utilized. However, in FIG. 4, in an ADD instruction immediately before the LD instruction, the reg2 is changed. Since the LD instruction loads data from an erroneous address, a failure occurs. This failure may be a failure occurring when a series of machine language instruction patterns illustrated in FIG. 4 exist, and may occur when individual intermediate languages are an address calculation instruction, an address calculation instruction, and a MOV instruction. Even if the pattern of machine languages is the pattern illustrated in FIG. 4, when, in the intermediate language, another instruction exists between the patterns of an address calculation instruction, an address calculation instruction, and a MOV instruction, this failure may not occur.

FIG. 5A and FIG. 5B illustrate an exemplary influence of a failure of a compiler on an object. As illustrated in FIG. 5A, the patterns of a machine language 502 and a machine language 504 coincide with the patterns of the machine languages illustrated in FIG. 4. As illustrated in object expansion information illustrated in FIG. 5B, the instructions of the intermediate language serving as a source are lined up in the order of an address calculation instruction, an address calculation instruction, and a MOV instruction. Therefore, the patterns of the machine language instructions and the patterns of the intermediate languages that correspond to individual machine languages and which are illustrated in the object expansion information are checked, and hence, it may be confirmed whether or not the failure of the compiler influences an object.

FIG. 6A and FIG. 6B illustrate an exemplary influence of a failure of a compiler on an object. In FIGS. 6A and 6B, the failure of the compiler may not influence an object. FIG. 6A illustrates a machine language within an object. A machine language 602 and a machine language 604 coincide with the patterns of the machine languages illustrated in FIG. 4. However, in object expansion information illustrated in FIG. 6B, a machine language corresponding to an addition instruction 612 of the intermediate language exists between two address calculation instructions. Therefore, the instruction patterns of the intermediate languages correspond to address addition, addition, address addition, and character comparison, and do not coincide with the instruction patterns of the intermediate languages illustrated in FIG. 4. It turns out that the failure of the compiler illustrated in FIG. 4 does not influence the machine language of an object illustrated in FIG. 6A and FIG. 6B.

The instruction pattern of the machine language within the object and the instruction pattern of the intermediate language of the object expansion information are compared with each other, and hence, it may be determined whether or not the failure of the compiler illustrated in FIG. 4 influences the object.

The failure of the compiler is not limited to the combination of the instruction pattern of the machine language and the instruction pattern of the intermediate language. For example, whether an operand is user data or compiler management data, the version of the machine language definition, the route information of the machine language definition or the like may be combined. In accordance with the content of a failure, a corresponding pattern may be different. Therefore, in accordance with a failure, an adequate pattern may be defined, and a portion of an object corresponding to the pattern may be searched for. The above-mentioned description may be an example relating to the search of the influence of a compiler failure on an object.

FIG. 7 illustrates an exemplary processing. The portion of the front-end illustrated in FIG. 1 may be omitted, and the portion of the back-end may be illustrated.

The intermediate language 130 generated in the front-end is invested in the processing illustrated in FIG. 7.

In an operation 702, the leading intermediate language of the intermediate language 130 is set as a processing target.

In an operation 704, the intermediate language is compiled, and a partial object including a machine language corresponding to the intermediate language is generated.

In an operation 708, a portion involved in the compilation, for example, an intermediate language definition name including a version or the like or expansion information where a used route or the like is identified, is acquired.

In an operation 710, a generated partial object and object expansion information are stored in a memory with being associated with each other.

In an operation 712, it is determined whether or not the processed intermediate language is the final intermediate language of the intermediate language 130. When the determination is "negative", the processing shifts to an operation 720. When the determination is "affirmative", the processing is terminated.

In the operation 720, the subsequent intermediate language of the intermediate language 130 is acquired as a processing target. The processing shifts to the operation 704.

By the above-mentioned processing, the object and object expansion information 140 are generated.

Operations in the above-mentioned flow may not be processed in the above-mentioned order. For example, the operation 704 and the operation 708 may be simultaneously executed. Alternatively, these may be executed in reverse order.

FIG. 8A and FIG. 8B illustrate an exemplary identification of a failure.

In FIG. 8A and FIG. 8B, in connection with a route R53 of the intermediate language definition where the intermediate language of character comparison is converted into a machine language, a failure is found.

FIG. 8A illustrates an intermediate language definition. In a conversion definition 802 in the intermediate language definition, a failure is found. The conversion definition 802 is fundamentally defined as an instruction, ROL w0,16. The route of this portion is defined as the route 53 (R53) by a setROOT(53) instruction.

Accordingly, when the failure of the compiler extends into an object, an entry that is a character comparison instruction and whose route is R53 exists within corresponding object expansion information.

As illustrated in FIG. 8B, an entry 812 is found that is an instruction for character comparison and where the route 53 (R53) exists. Therefore, it turns out that the failure of the compiler extends into a portion of a machine language existing at an offset 0000001B0. An offset illustrated in FIG. 6B is expressed with a hexadecimal number.

Figure 9A:
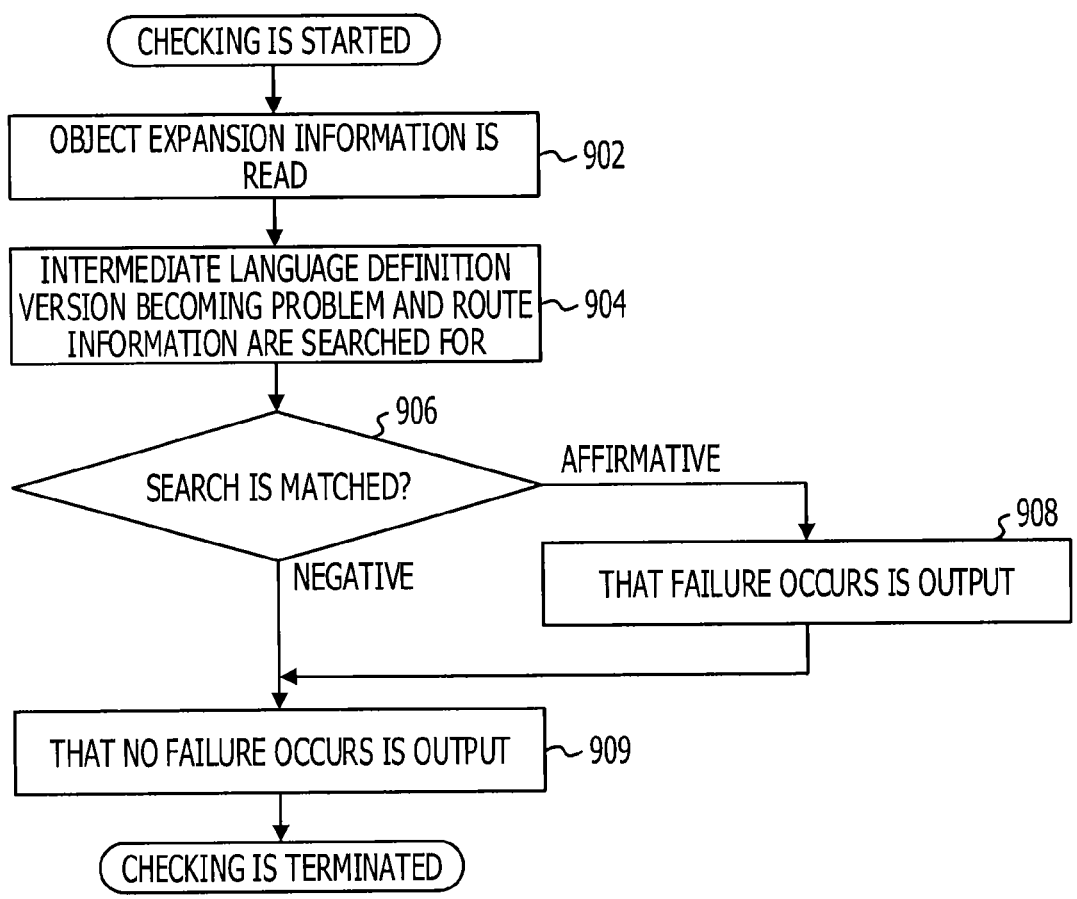
FIG. 9A and FIG. 9B illustrate exemplary confirmation of an influence of a failure in compilation on an object.
Figure 9B:
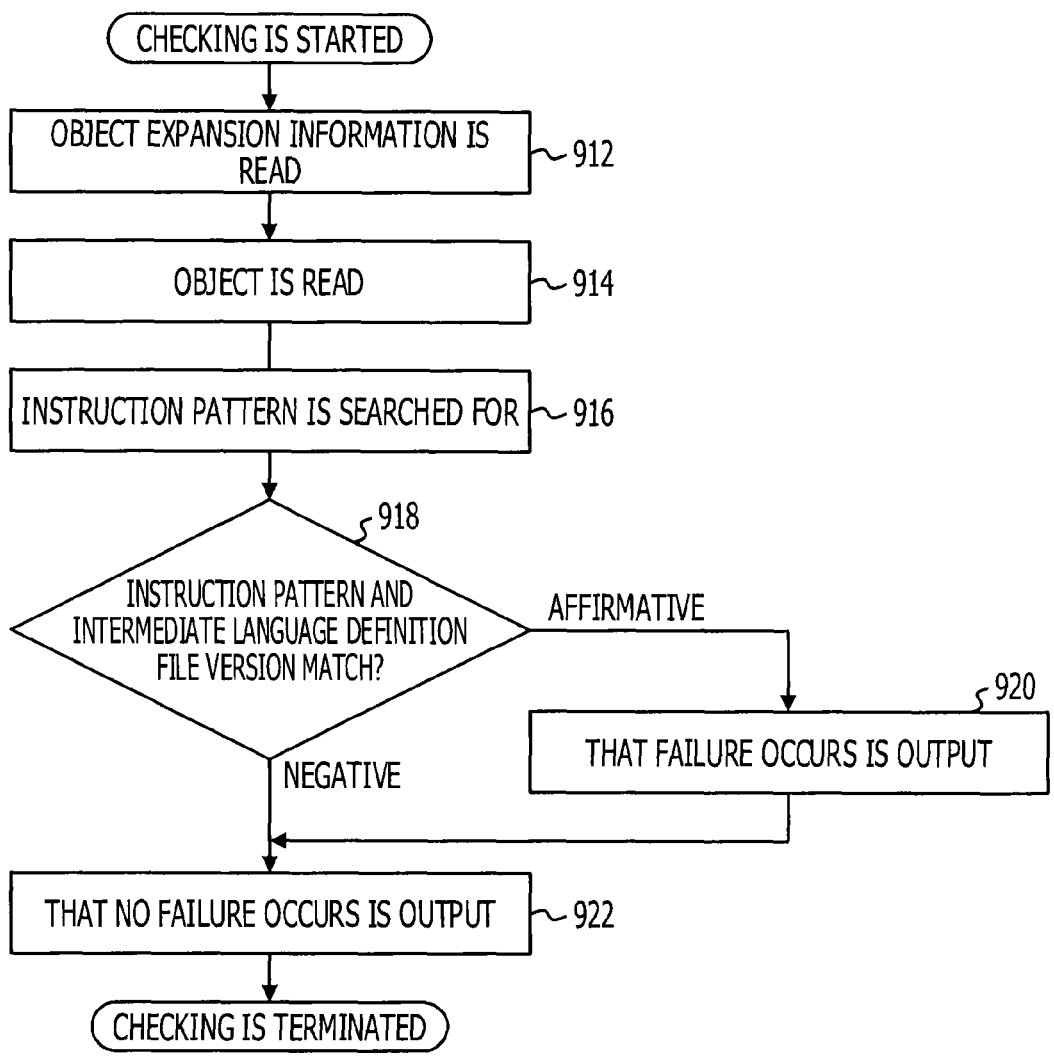

FIG. 9A and FIG. 9B illustrate an exemplary confirmation of an influence of a failure in compilation on an object.

FIG. 9A illustrates a flowchart for confirming object expansion information. For example, in FIG. 9A, by only confirming the object expansion information, the influence of a compilation failure is confirmed. For example, the version of an intermediate language definition involved in the failure and the route thereof may be checked.

In an operation 902, object expansion information is read.

In an operation 904, the version of intermediate language definition relating to the compilation failure and route information are searched for.

In an operation 906, it is checked whether an entry matching the search has existed in the object expansion information. When a check result is "affirmative", the processing shifts to an operation 908. When the check result is "negative", the processing shifts to an operation 909.

In the operation 908, that a failure has occurred may be output to a display or the like. A portion matched in the search of the object expansion information may be analyzed, and the offset address information of a machine language subject to the influence of the compilation failure, a machine language at an offset address or the like may be displayed.

In an operation 909, that no failure has been found may be output to the display or the like.

FIG. 9B illustrates a flowchart where the pattern of a failure based on the combination of both of the pattern of a machine language in an object and object expansion information is detected.

In an operation 912, object expansion information is read.

In an operation 914, an object is read.

In an operation 916, it is checked whether the pattern of a machine language of the object and the pattern of the object expansion information have matched a search.

In an operation 918, a check result is determined. When the check result is "affirmative", the processing shifts to an operation 920. When the check result is "negative", the processing shifts to an operation 922.

In the operation 920, that a failure has occurred may be output to the display or the like. The object expansion information or a portion of the object, which has matched the search, may be displayed.

In the operation 922, that no failure has been found may be output to the display or the like.

Figure 10:
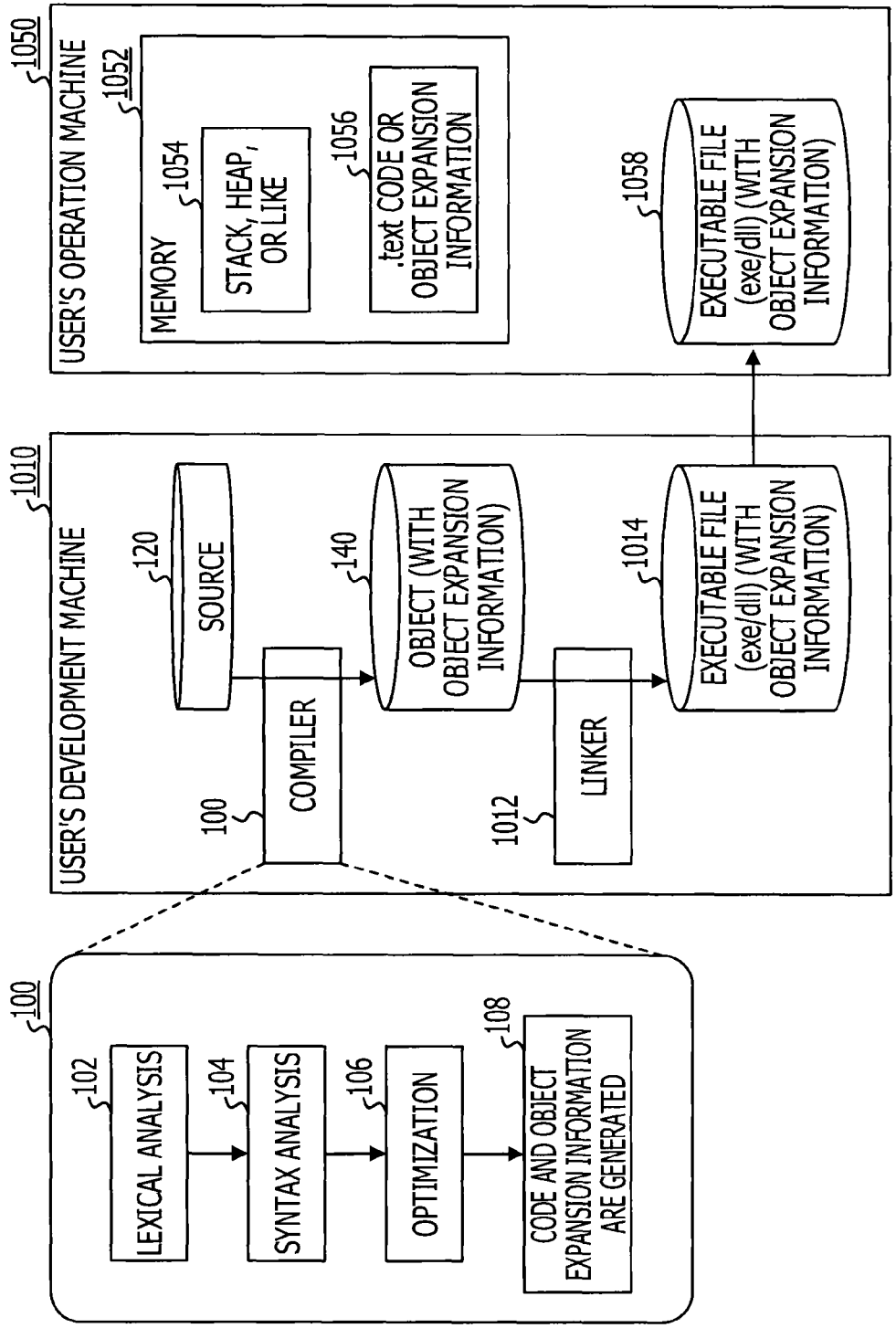
FIG. 10 illustrates an exemplary system.

FIG. 10 illustrates an exemplary system.

Using the compiler 100 illustrated in FIG. 1, a user's development machine 1010 compiles the source 120 to acquire the object and object expansion information 140. The object may be converted into an executable file by a linker 1012. The executable file may include object expansion information. The object expansion information may be stored posterior to an object stored in the .txt portion of an executable file such as .dll. The object expansion information may be compressed and stored by a compression program or the like. An object may be checked so as to find the failure of the compiler.

In a user's operation machine 1050, a created executable file 1014 may be stored in a storage medium 1058 such as a hard disk. On a memory 1052, a region 1054 such as a stack or a heap may be included. The information of .text within the executable file or the object expansion information may be loaded into the memory 1052, and an object may be executed. The object may be checked so as to find the failure of the compiler.

Figure 11:
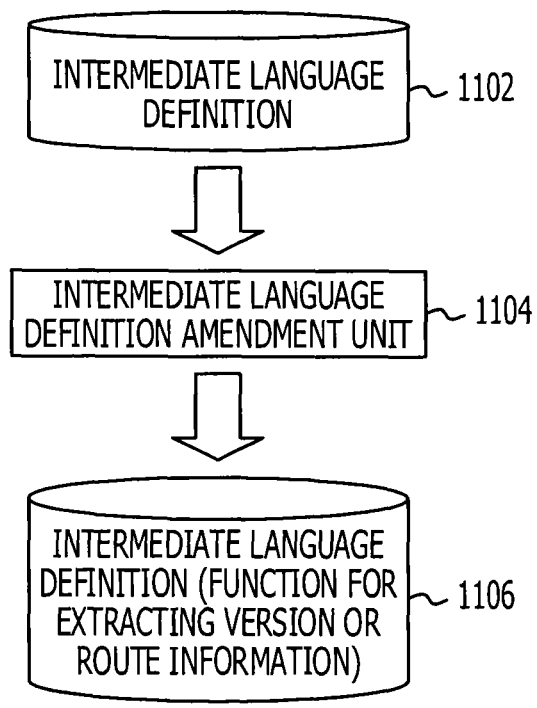
FIG. 11 illustrates an example of processing for an intermediate language definition.

FIG. 11 illustrates an exemplary processing for an intermediate language definition.

The version information of an intermediate language definition or the information of a used route may be acquired. For example, a modification for adding, within an existing intermediate language definition, an instruction used for acquiring the version information of an intermediate language definition or the information of a used route may be performed.

An existing intermediate language definition 1102 is input to an intermediate language definition amendment unit 1104.

The intermediate language definition amendment unit 1104 adds, within the existing intermediate language definition, the instruction used for acquiring the version information of an intermediate language definition or the information of a used route.

By the processing for adding, an intermediate language definition 1106 is generated that has a function for extracting the version information of an intermediate language definition or route information.

FIG. 12 illustrates an exemplary intermediate language definition.

The intermediate language definition illustrated in FIG. 12 is described using a C language.

In a row 1210, the name of an intermediate language definition and the information of a version or the like are acquired using a set function.

In rows 1221, 1222, 1223, 1224, 1225, 1226, 1227, 1228, and 1229, using the set function, routes are defined in units of basic blocks separated by branching instructions. When a specific basic block has been executed, the set function of a corresponding portion is executed. Therefore, the information of a route is acquired.

Based on the acquired information, the entry of object expansion information is generated.

Figure 13:
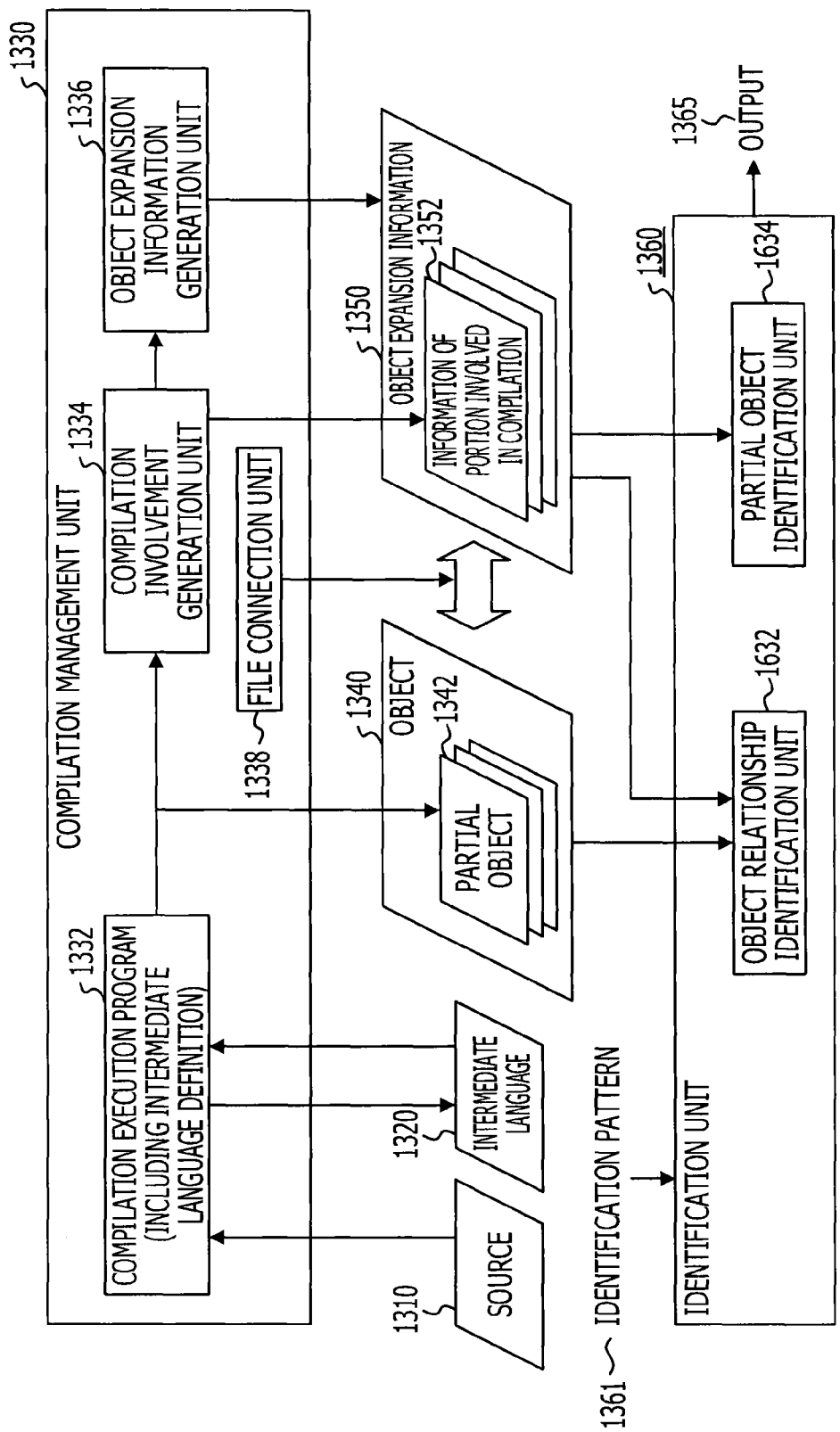
FIG. 13 illustrates an exemplary functional block.

FIG. 13 illustrates an exemplary functional block. The functional block illustrated in FIG. 13 includes a compilation management unit 1330 and an identification unit 1360.

In the compilation management unit 1330, a source 1310 is input to a compilation execution program 1332 including an intermediate language definition. The compilation execution program 1332 may generate an intermediate language 1320. The intermediate language 1320 is sequentially converted into a partial object 1342 by a compilation execution program. The compilation execution program transmits, to a compilation involvement generation unit 1334, the information of the usage situation or the like of an intermediate language definition unit at the time of compilation.

The compilation involvement generation unit 1334 may store, within the object expansion information, information involved in the compilation, for example, an intermediate language name or route information or the like used in the intermediate language definition unit, as the information 1352 of a portion involved in the compilation, with associating the information involved in the compilation with a partial object.

An object expansion information generation unit 1336 may integrate information such as the information 1352 of a portion involved in the compilation and generate object expansion information 1350.

A file connection unit 1338 may connect an object 1340 and the object expansion information 1350 to each other. The object 1340 and the object expansion information 1350 may be connected within, for example, one .text file.

When the failure of the compiler has been found, the identification unit 1360 may be used.

An identification pattern 1361 is acquired that is created by an operator based on the failure of the compiler.

A partial object identification unit 1364 compares the object expansion information 1350 and the identification pattern 1361 with each other, and checks whether or not matching object expansion information exists. A check result may be output (1365).

An object relationship identification unit 1362 reads and compares the object and the object expansion information with the identification pattern 1361, and checks whether or not a matching pattern exists. A check result may be output (1365).

Figure 14:
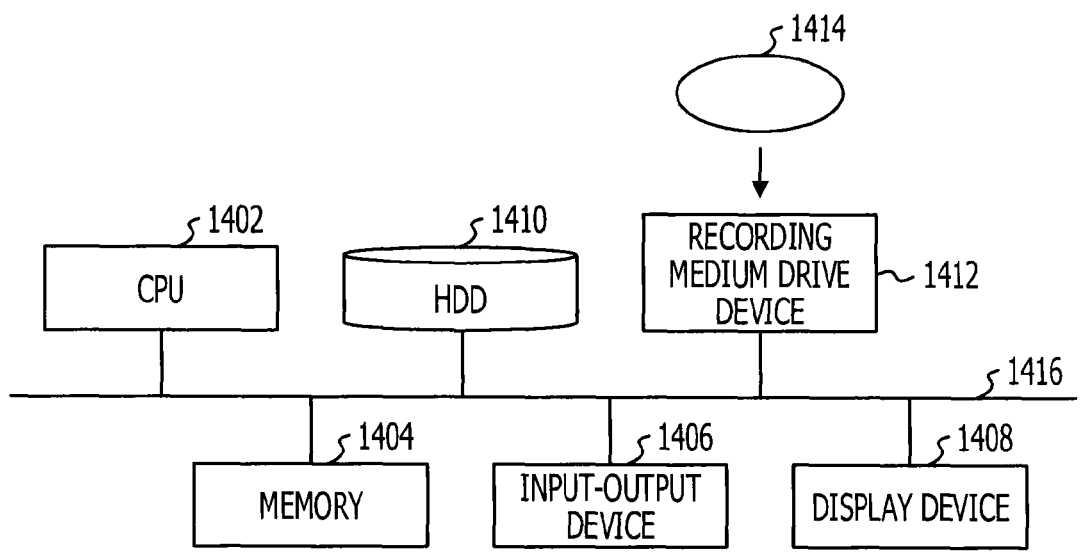
FIG. 14 illustrates an exemplary configuration of hardware.

FIG. 14 illustrates an exemplary configuration of hardware. The hardware may include a CPU 1402, a memory 1404, an input-output device 1406, a display device 1408, a hard disk 1410, and a recording medium drive device 1412. The individual devices are connected via a bus 1416. The recording medium drive device 1412 may perform reading and writing on a portable recording medium 1414.

The compilation management unit 1330, the identification unit 1360, the intermediate language definition amendment unit 1104, or the like may be implemented into the hardware. The processing of each flowchart illustrated in the drawing may also be executed.

The whole or part of the above-mentioned processing may be implemented owing to a program. The program may be stored in the portable recording medium 1414. The portable recording medium 1414 may be one or more non-transitory recording media having structures or a tangible recording medium. For example, the portable recording medium 1414 may include a magnetic recording medium, an optical disk, a magneto-optical recording medium, a nonvolatile memory, or the like. The magnetic recording medium may include an HDD, a flexible disk (FD), a magnetic tape (MT), or the like. The optical disk may include a digital versatile disc (DVD), a DVD-RAM, a compact disc-read only memory (CD-ROM), a CD-recordable (CD-R), a CD-rewritable (CD-RW), or the like. The magneto-optical recording medium may include a magneto-optical disk (MO) or the like. A program stored in a portable recording medium is read, the program is executed by a processor, and hence, the whole or part of the above-mentioned processing may be implemented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable medium storing a compiling program to be executed by a computer, the program comprising:

compiling a portion of a source corresponding to at least one operation of a plurality of operations into at least one partial object of a plurality of partial objects included in an object;

generating first information for identifying a portion involved in the compiling of the at least one partial object and including a version of an intermediate language definition used for converting an intermediate language generated in the compiling into the object and third information for identifying a portion of the intermediate language definition which is used in compilation; and storing, in a memory, object expansion information including second information, which indicates the at least one operation, and the first information, with associating the object expansion information with the at least one partial object, wherein the object expansion information identifies a partial object generated by a portion involved in the compiling relating to a compilation failure by associating the version of the intermediate language definition and the third information with an identification of the at least one partial object.

2. The non-transitory computer readable medium according to claim 1, wherein the object expansion information is used for identifying whether or not a positional relationship between the plurality of partial objects generated by the portion involved in the compiling relating to the compilation failure satisfies a predetermined relationship.

3. The non-transitory computer readable medium according to claim 1, wherein the second information is decided based on an intermediate language generated in the compiling.

4. The non-transitory computer readable medium according to claim 1, the program further comprising:

connecting the object and the object expansion information to one file.

5. The non-transitory computer readable medium according to claim 1, the program further comprising:
  identifying whether or not a positional relationship between the plurality of partial objects satisfies a predetermined relationship based on the object and the object expansion information.

6. A compiling method comprising:
  compiling, by a computer, a portion of a source corresponding to at least one operation of a plurality of operations into at least one partial object of a plurality of partial objects included in an object;
  generating first information for identifying a portion involved in the compiling of the at least one partial object and including a version of an intermediate language definition used for converting an intermediate language generated in the compiling into the object and third information for identifying a portion of the intermediate language definition which is used in compilation; and
  storing, in a memory, object expansion information including second information, which indicates the at least one operation, and the first information, with associating the object expansion information with the at least one partial object, wherein
  the object expansion information identifies a partial object generated by a portion involved in the compiling relating to a compilation failure by associating the version of the intermediate language definition and the third information with an identification of the at least one partial object.

7. The compiling method according to claim 6, wherein
  the object expansion information is used for identifying whether or not a positional relationship between the plurality of partial objects generated by the portion involved in the compiling relating to the compilation failure satisfies a predetermined relationship.

8. The compiling method according to claim 6, wherein
  the second information is decided based on an intermediate language generated in the compiling.

9. The compiling method according to claim 6, further comprising:
  connecting the object and the object expansion information to one file.

10. The compiling method according to claim 6, further comprising:
  identifying whether or not a positional relationship between the plurality of partial objects satisfies a predetermined relationship based on the object and the object expansion information.

11. A compiling device comprising:
a central processing unit (CPU); and
a memory configured to store a program to be executed by the CPU,
wherein the CPU performs, based on the program, operations to:
  compile a portion of a source corresponding to at least one operation of a plurality of operations into at least one partial object of a plurality of partial objects included in an object;
  generate first information for identifying a portion involved in the compiling of the at least one partial object and including a version of an intermediate language definition used for converting an intermediate language generated in the compiling into the object and third information for identifying a portion of the intermediate language definition which is used in compilation;
  store, in a memory, object expansion information including second information, which indicates the at least one operation, and the first information, with associating the object expansion information with the at least one partial object; and
  identify, based on the object expansion information, a partial object generated by a portion involved in the compiling relating to a compilation failure by associating the version of the intermediate language definition and the third information with an identification of the at least one partial object.

12. The compiling device according to claim 11, wherein
the object expansion information is used for identifying whether or not a positional relationship between the plural partial objects generated by the portion involved in the compiling relating to the compilation failure satisfies a predetermined relationship.

13. The compiling device according to claim 11, wherein
the second information is decided based on an intermediate language generated in the compiling.

14. The compiling device according to claim 11, wherein
the operations includes coupling the object expansion information to one file.

15. The compiling device according to claim 11, wherein
whether or not a positional relationship between the plurality of partial objects satisfies a predetermined relationship is identified based on the object and the object expansion information.

* * * * *